J. C. POETZ.
STEP LADDER.
APPLICATION FILED DEC. 4, 1916.

1,283,424.

Patented Oct. 29, 1918.

INVENTOR
John C. Poetz.

BY
G. J. Bowman
ATTORNEY

UNITED STATES PATENT OFFICE.

JOHN C. POETZ, OF SPOKANE, WASHINGTON.

STEP-LADDER.

1,283,424.     Specification of Letters Patent.     Patented Oct. 29, 1918.

Application filed December 4, 1916. Serial No. 134,849.

*To all whom it may concern:*

Be it known that I, JOHN C. POETZ, a citizen of the United States, residing at Spokane, in the county of Spokane and State of Washington, have invented a new and useful Step-Ladder, of which the following is a specification.

My invention relates to improvements in step ladders having a rod on which are mounted members for climbing up and down the rod, particular reference being made to my application for patent on a climbing device, filed May 10, 1916, Serial No. 96,540; and the objects of my improvement are to provide a base for the rod that can be adjusted to uneven or sloping ground to maintain the rod in a proper position for climbing, and to provide a support for the rod that is stable and firm under all conditions, and that may be easily transported and handled under all circumstances.

I attain these objects by the construction and arrangement of parts illustrated in the accompanying drawing, in which—

Figure 6:
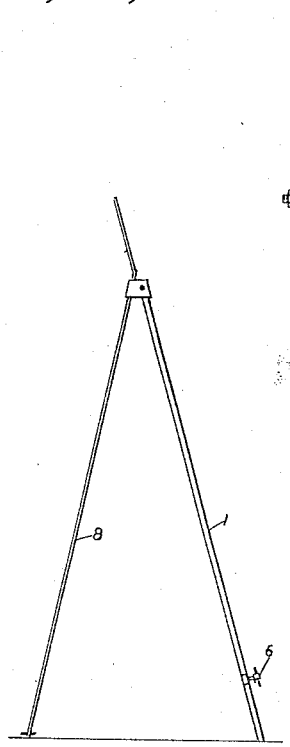
Figure 2:
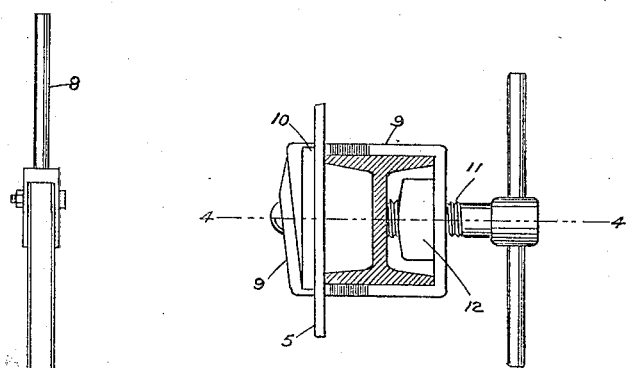
Figure 3:
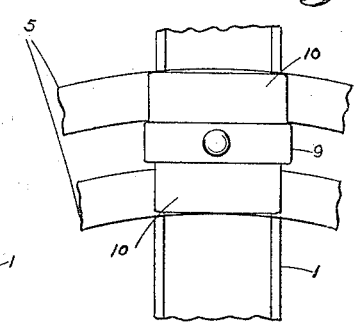
Figure 4:
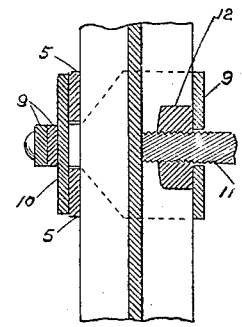
Figure 5:
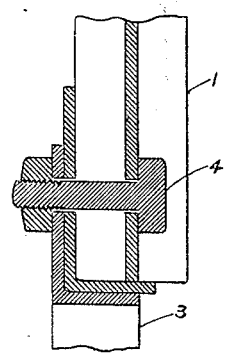
Figure 1:
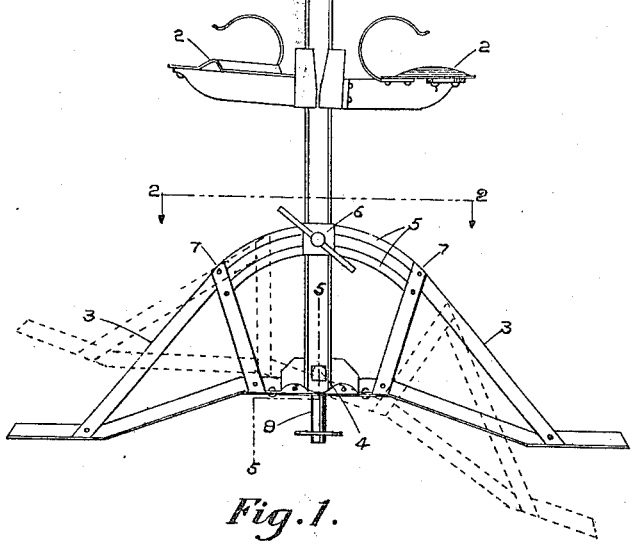

Figure 1 is a front view of my invention; Fig. 2 is a cross-section on the line 2—2, Fig. 1; Fig. 3 is a rear view of device for clamping the rod to the supporting base; Fig. 4 is a cross-section on the line 4—4; Fig. 2; Fig. 5 is a cross-section on the line 5—5, Fig. 1; and Fig. 6 is a side view of my improved ladder set up ready for use.

Referring to the drawing, 1 is a rod on which are mounted climbing members 2 for climbing up and down the rod 1. To provide a base for the rod 1 that can be adjusted to uneven ground so as to maintain the rod 1 in a position suitable for climbing, the rod 1 is adjustably mounted on the arched support 3, the lower end of the rod 1 being pivoted by bolt 4 to the support 3, the rod 1 being clamped to the curved pieces 5 by the clamp 6 in any position on the arc 7—7 to adapt the base 3 to the character of the ground. To provide a lateral support for the rod 1 to maintain it in a position for climbing, the rod 8 is pivoted to the upper end of rod 1 near its upper end, the end of rod 8 above the pivot being bent backward so as to be in line with the rod 1 when the rod 8 is acting as such support (see Fig. 6), so as to form a hand-fold for the climber when on the upper end of the rod 1.

The clamp 6 is composed of the collar 9, which incloses the rod 1 between the curved pieces 5, the key 10 being inserted between the curved pieces 5 and the collar 9 to form a clamping bearing, the hand-screw 11 being mounted on the collar 9, passing through a threaded aperture in the nut 12 and collar 9 and bearing against the rod 1 so as to clamp the key 10 against the curved pieces 5, and thereby rigidly hold the rod 1 in the desired position on the base 3.

Having thus fully described my invention, what I claim and desire to secure by Letters Patent is—

The combination with a rod adapted for climbing, and a transverse base attached thereto, of a supporting member pivoted near its upper end to the upper end of the rod, the portion of the supporting member above the pivot being bent backward so as to be in line with the rod when in position for climbing.

JOHN C. POETZ.

Witnesses:
W. H. MACFARLAN,
G. J. BOWMAN.

Copies of this patent may be obtained for five cents each, by addressing the "Commissioner of Washington, D. C."